J. W. STRANGE.
Balance Scales.
No. 24,669.
Patented July 5, 1859.
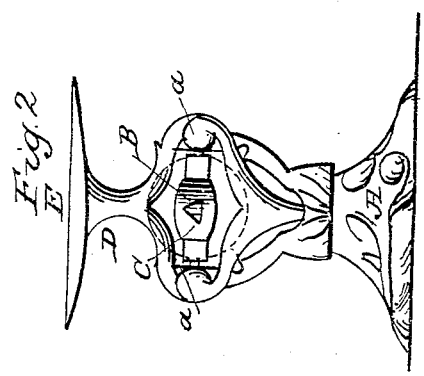
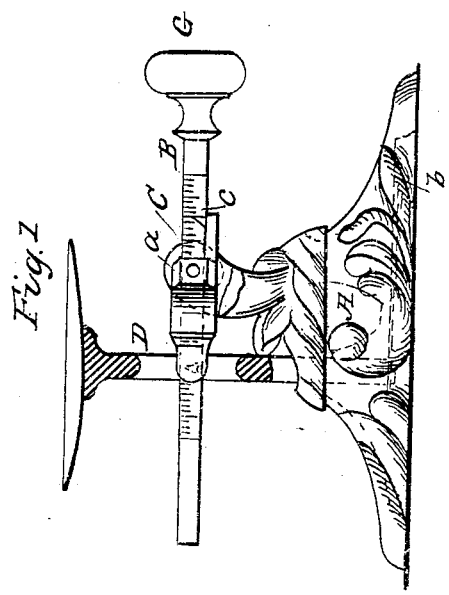
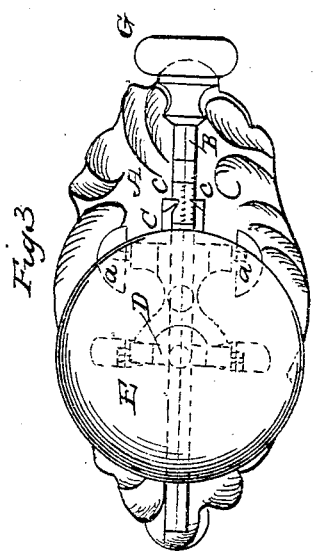
WITNESSES
Isaac S. Whitman
William S. Whitman
INVENTOR
Joseph W. Strange

UNITED STATES PATENT OFFICE.

JOSEPH W. STRANGE, OF BANGOR, MAINE.

SCALE FOR WEIGHING.

Specification of Letters Patent No. 24,669, dated July 5, 1859.

*To all whom it may concern:*

Be it known that I, J. W. STRANGE, of Bangor, in the county of Penobscot and State of Maine, have invented certain new and useful Improvements in Weighing-Scales; and I do hereby declare that the following is a full, clear, and exact description of the same, reference being had to the accompanying drawings, forming a part of this specification, in which—

Figure 1 represents a sectional side view of my invention. Fig. 2 is a front elevation of ditto. Fig. 3 is a plan or top view of the same.

Similar letters of reference in the three views indicate corresponding parts.

This invention consists in arranging a loaded scale beam, which may be triangular, round, or polygonal, in such a manner that the weight of the substance placed on the scales can be ascertained by sliding the beam in a socket, the end of which forms the pointer or index and which is so arranged that the beam can be turned in the same so that when the several sides of the beam are marked with different indications, either one of those may be brought before the eyes of the operator.

To enable those skilled in the art to fully understand, make and use my invention I will proceed to describe its construction and operation.

A represents a standard made of cast iron or any other suitable material, on which the scales are mounted in the usual manner. The scale beam, B, is fitted into a socket, C, which vibrates on scale points, $a$, in the sides of the standard, A, and supported by the front end of this socket is the pin, D, which bears the platform or scale, E. The lower end of the pin, D, is guided by a hinged arm, F, which is secured to the under side of the standard, A, by means of a pivot, $b$.

The beam, B, is triangular but it may be made of any other regular form, that is to say, round or polygonal, and it is fitted into the socket, C, in such a manner that it can be turned over in the same, so that either one of its sides can be brought in front, and these sides are marked with different indications or scales one of which may represent the troy weight, another one the avoirdupois, and still another the medicinal weight so that the weight of a substance placed on the platform can be read off in either one or the other of the above named indications.

The end of the socket forms the indexes or pointers, $c$, and a permanent weight, G, is firmly secured to the end of the beam, B, which serves to counterbalance the weight of the articles placed on the platform. It will be easily understood that larger weights can thus be ascertained by drawing the beam out so as to bring the center of gravity of the same, together with the weight, G, farther from the fulcrum of the socket, C, or smaller weights by pushing the beam in so as to bring its center of gravity nearer to the fulcrum of the socket, C, which latter is fulcrated in the scale points, $a$, as before stated.

By turning the beam in the socket either one of the indications marked on the same can be brought before the eye of the operator so that there is no need of changing the position of the scales in order to see plainly the different indications from the same standpoint, and the same index or pointer, $c$, serves for all the indications.

What I claim as new and desire to secure by Letters Patent is:—

1. Arranging the beam in such a manner that the several indications or scales marked on the same can be brought before the eye of the operator by turning the beam substantially as described.

2. The arrangement of the socket, C, so that its end forms the common index or pointer, $c$, for the several indications marked on the sides of the beam substantially as and for the purpose specified.

JOSEPH W. STRANGE.

Witnesses:
ISAAC S. WHITMAN,
WILLIAM S. WHITMAN.